United States Patent [19]

Zimmerly

[11] 4,064,052
[45] Dec. 20, 1977

[54] FRACTIONATOR MODULES HAVING LIP SEALS
[75] Inventor: Robert D. Zimmerly, Kenosha, Wis.
[73] Assignee: Ladish Co., Cudahy, Wis.
[21] Appl. No.: 700,415
[22] Filed: June 28, 1976
[51] Int. Cl.² .............................................. B01D 31/00
[52] U.S. Cl. ............................................. 210/433 M
[58] Field of Search ................. 210/433 M, 494, 450, 210/321 WT, 91

[56] References Cited
U.S. PATENT DOCUMENTS

| | | | |
|---|---|---|---|
| 3,880,755 | 4/1975 | Thomas et al. | 210/91 |
| 3,950,248 | 4/1976 | Brown et al. | 210/91 X |
| 3,953,334 | 4/1976 | Brun et al. | 210/433 M X |
| 4,016,083 | 4/1977 | Sakaguchi et al. | 210/433 M |

Primary Examiner—Frank A. Spear, Jr.
Assistant Examiner—E. R. Cross
Attorney, Agent, or Firm—Wheeler, Morsell, House & Fuller

[57] ABSTRACT

A module, utilizing a spirally wound membrane envelope, and adapted to be fitted into a containment tube of a fractionator, has a lip seal between the module and the containment tube, there being small apertures in the lip of the seal arranged and directed so as to allow a small controlled flow to continually bypass the module and thus prevent the product from becoming stagnant behind the seal.

10 Claims, 4 Drawing Figures

U.S. Patent     Dec. 20, 1977     4,064,052
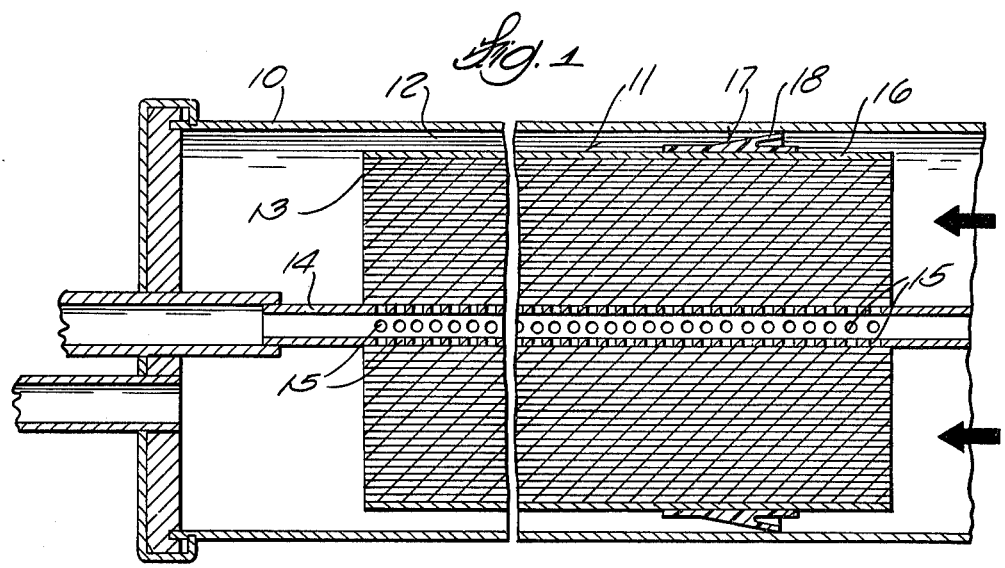
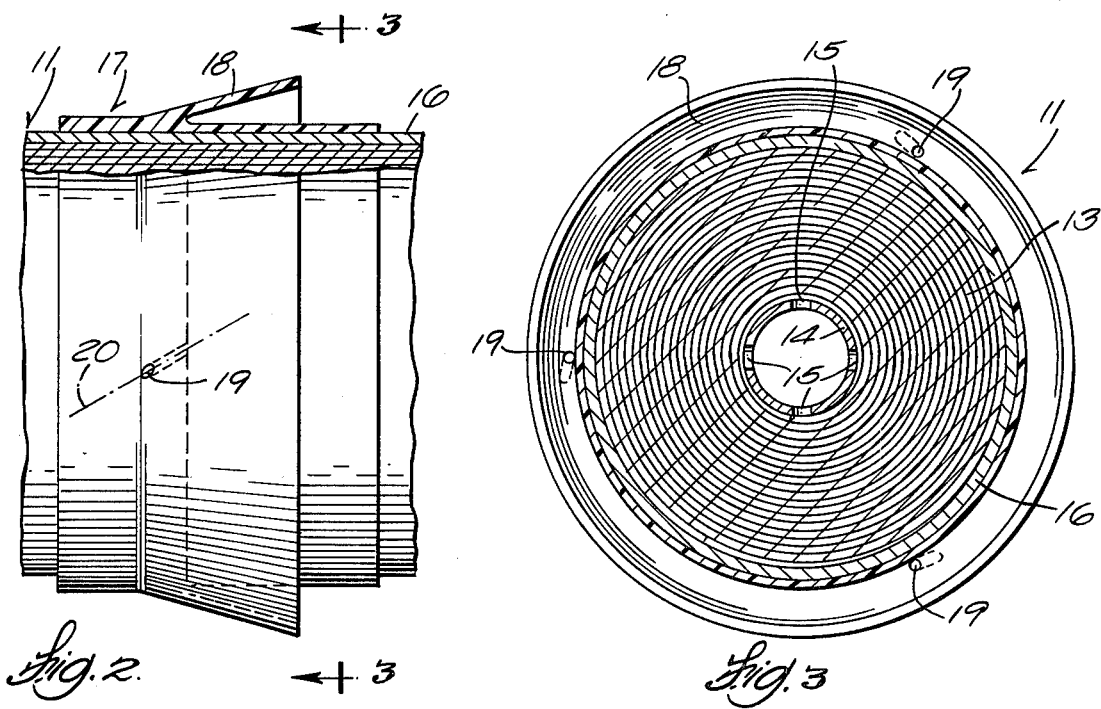
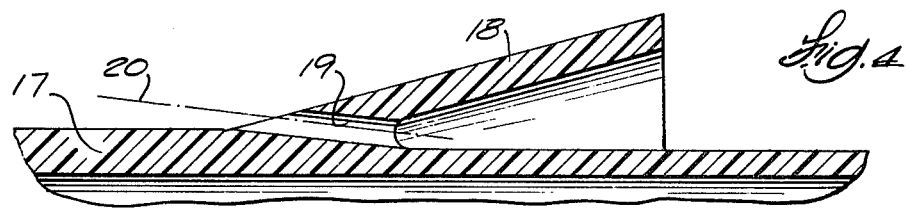

FRACTIONATOR MODULES HAVING LIP SEALS

BACKGROUND OF THE INVENTION AND DESCRIPTION OF THE PRIOR ART

A fractionator is a machine that utilizes the ultra-filtration or reverse osmosis technique of membrane separation for food products and by-products.

One typical use for the machine of the present invention is to separate the protein out of cheese whey, as disclosed in U.S. Pat. No. 3,880,755, although it is not restricted to this use. The embodiment disclosed in the present invention utilizes a spiral wound element which consists of a sealed envelope of membrane material resembling a plastic bag, the neck of which is attached to a hollow tube, the latter having a series of holes running longitudinally. These holes communicate with the neck of the bag so that material that passes through the membrane will migrate to the neck of the bag, enter the hollow tube through the holes therein, and be drawn off. The plastic-like bag is wound up in a spiral manner much like a window shade, and the entire outside is covered with a wrapping. These elements or modules are then placed end to end in long tubes, usually six to a tube, and conncted together with special interconnectors as shown in U.S. Pat. No. 3,880,755. U.S. Pat. Nos. 3,367,504 and 3,933,646 also disclose spirally wound membrane envelopes.

In this general type of apparatus there is an annular space between the outer surface of the module and the inner surface of the tube in which product might flow and bypass the module. To prevent this, U.S. Pat. No. 3,880,755 discloses a one directional lip-type seal attached to the outside of the module so that, in forward flow, the product is forced to flow through the module.

In water purification systems, the above described arrangement is very desirable, but in food product applications, and in particular where the food is intended for human consumption, the lip seal has presented a serious problem. The modules are customarily 39 inches long, and the lip seal is close to the leading edge. Thus the product can then get back to the seal from the backside and become stagnant. To prevent this, health authorities have required that the machine be stopped every 30 minutes, that the valves be adjusted, and that the pumps be restarted so that flow is established in the reverse direction for one minute. The purpose of this is to force the stagnant product past the lip seal by collapsing it and, thereby, replacing it with fresh product. This method was acceptable but required complex programming of switches, required extra controls, and caused undue wear and tear on the modules, and lost production time.

SUMMARY OF THE INVENTION

In the device disclosed, a cylindrical fractionating module is utilized within a containment tube, there being an annular space between the module and the tube, and there being an annular lip seal for sealing said annular space. With the present invention, small aperture means is provided through the lip of the lip seal, which aperture means is arranged to allow a small controlled flow to continually bypass the module through the annular space, and prevent stagnation of the product behind the seal.

A general object of the invention is to provide an improved module having a lip seal which has a simple means for preventing stagnation of the product behind the seal, thereby eliminating the extra controls heretofore required for reversing the flow, greatly reducing the wear and tear on the delicate membrane, increasing production, and providing a more sanitary method of preventing stagnation, and insuring a superior finished product.

A further object of the invention is to provide an improved arrangement wherein a jet stream action is created which, in addition to preventing stagnation behind the seal, is also effective in setting up turbulent flow patterns that tend to clean and keep clean the exterior surface of the module, both in front of and behind the lip seal.

With the above and other objects in view, the invention consists of the improved fractionator modules having lip seals, and all of the parts and combinations as set forth in the claims, and all equivalents thereof.

DESCRIPTION OF THE DRAWINGS

In the accompanying drawings, in which the same reference numerals designate the same parts in all of the views:

FIG. 1 is a fragmentary longitudinal sectional view through a containment tube showing a module positioned therein;

FIG. 2 is a fragmentary view showing principally the outside of a module, parts being broken away and shown in longitudinal section;

FIG. 3 is a sectional view taken on the line 3—3 if FIG. 2; and

FIG. 4 is an enlarged fragmentary sectional view showing a portion of a lip having one of the holes therein.

DETAILED DESCRIPTION OF THE INVENTION

Referring more particularly to the drawings, the improved modules are designed for use in a machine such as that fully described in U.S. Pat. No. 3,880,755, issued Apr. 29, 1975. In this patent, however, complicated valves and controls are required for reversing the flow periodically to prevent stagnation of the product behind the lip seal. The feature of the present invention eliminates the necessity for such arrangement.

In the illustrated embodiment, a containment tube 10, forming part of a fractionator of the general type shown in U.S. Pat. No. 3,880,755, has a module 11 therein, there being an annular space 12 between the module and the interior of the containment tube. As described in U.S. Pat. No. 3,880,755, the module 11 is a spirally wound element which consists of a sealed envelope 13 of membrane material resembling a plastic bag and a feed spacer, the envelope and spacer being spirally wound around a hollow tube 14 which has a series of holes 15 therein extending for substantially the length of the module. As has been heretofore taught by the prior art, the neck of the plastic bag 13 is so attached to the tube 14 that the holes 15 communicate with the interior of the bag so that any material which passes through the membrane material into the spirally wound bag will migrate spirally to the neck of the bag, enter the hollow tube through the holes 15, and then be drawn off through the tube.

The membrane material is wound up in a spiral manner, much like a window shade, and the entire outside is covered with a wrapping 16. The end edges of the spirally wound membrane envelope, which appear at the ends of the module, are sealed together. A number of modules are placed end to end in relatively long containment tubes and are connected together with special interconnectors, as illustrated in U.S. Pat. No. 3,880,755.

In use of this type of device, the components of whey are separated by causing them to flow axially under pressure between layers of the spirally wound module, with the low molecular weight materials passing through the membrane material into the interior of the spirally wound bag. These membranes having a very high percent of retention of lactalbumin, the soluble milk protein. This protein concentrate accounts for 14% by volume of the whey and is removed by the fractionator. The remainder of the whey solution is permeate, and this is drawn off through the tube 14.

Heretofore the whey was an unproductive by-product, presenting a disposal problem. With the use of fractionators of the type disclosed in the present invention, the protein recovery presents an important source of profit. With the present invention the lost time and expense heretofor encountered in periodically reversing the flow to prevent stagnation has been eliminated. With the present invention it has been found that by the use of a small number of holes or apertures, a controlled amount of flow through the annular space 12 may be provided which prevents the product from becoming stagnant behind the lip seal 17. This lip seal is otherwise similar to that disclosed at 46 in U.S. Pat. No. 3,880,755. These lip seals are formed of suitable material, such as rubber or plastic, and include lips 18 which resiliently bear against the inner side of the wall of the containment tube 10.

With the flow in the direction indicated by the arrows in FIGS. 1 and 2, a controlled amount of the product passes into the V of the lip seal and through holes 19 at the juncture between the lip 18 and the base of the lip seal, the holes providing elongated bypass ducts 19. These holes or ducts 19 allow a small controlled amount of flow to continually bypass the module into the annular space 12 and prevent the product from becoming stagnant behind the seal. While the number of holes, the size of the holes, and the orientation may be varied considerably, it has been found that the arrangement illustrated is particularly effective. Here three of the holes 19 are employed, 120° apart. Normally this type of machine operates with a differential pressure across each module of from 5 - 10 psi, the flow being between 10 and 20 gpm, 7 psi and 15 gpm being the norm. The present invention, however, is not limited to these values. Tests show that a 7 psi differential pressure, and at 14 gpm total flow, 0.7 gpm will pass through three equally spaced 1/16 inch diameter holes 19.

In order to make the arrangement still more effective, it has been found desirable to have the center line 20 (FIG. 2) of each bypass duct at a 30° angle with respect to the center line of the module. This gives a superior spiral motion to the product as it passes over the exterior of the module. However, satisfactory results can be obtained at other angles or when the center line of the holes is parallel to the center line or axis of the module.

It has also been determined that by having the center line 20 angled outwardly at a small angle, as shown in FIG. 4, that this causes the jet stream created by the elongated bypass ducts to be directed toward the wall of the containment tube 10 instead of against the covering 16 of the module where erosion might occur. The angle 20 shown in FIG. 4 is preferably about 5°, but the angle may be varied.

Dye tests have shown that the features of the present invention have resulted in a complete change of the product behind the seal every 45 – 60 seconds. This is thirty times more often than is obtained with the forward flow-reverse flow method of the prior art.

It is also found that with the present invention the jet stream action is effective in setting up turbulent flow patterns which tend to clean and keep the exterior surfaces of the module clean, both in front of and behind the lip seal. This is much more effective than the corresponding cleaning resulting from the backflush method.

Various changes and modification may be made without departing from the spirit of the invention, and all of such changes are contemplated as may come within the scope of the claims.

What I claim is:

1. In a fractionator having a containment tube, a cylindrical fractionating module within said containment tube through which portions of a product to be fractionated are adapted to pass axially under pressure, an annular space between the module and tube, and an annular lip seal for sealing said annular space, the improvement comprising small aperture means through the lip of said lip seal to allow a small controlled flow to continually bypass the module through said annular space and prevent stagnation of the product behind said seal.

2. A fractionator as claimed in claim 1 in which the aperture means comprises several small peripherally spaced holes.

3. A fractionator as claimed in claim 1 in which the aperture means comprises three small holes which are equally spaced peripherally.

4. A fractionator as claimed in claim 2 in which the holes pass through seal material of substantial thickness to provide elongated bypass ducts.

5. A fractionator as claimed in claim 4 in which the axes of the bypass ducts are at an angle with respect to the axis of the module to create a spiral flow for product which passes through the bypass ducts.

6. A fractionator as claimed in claim 4 in which the axes of the passageways are angled outwardly away from the module.

7. A fractionator as claimed in claim 1 in which the aperture means is at the junction between the base of the seal and the lip.

8. A fractionator as claimed in claim 1 in which the fractionating module is a spirally wound membrane envelope.

9. A fractionator as claimed in claim 7 in which the aperture means comprises holes which provide elongated bypass ducts through the material at the junction between the base of the seal and the lip.

10. A fractionator as claimed in claim 9 in which the lip seal provides an annular pocket which is V-shaped in cross-section providing a V which is open toward the direction of flow and in which the bypass ducts are near the apex of said V.

* * * * *